June 10, 1958    O. L. STEVENS ET AL    2,837,902
MECHANICAL TORSIONAL VIBRATION DAMPER
Filed July 12, 1956
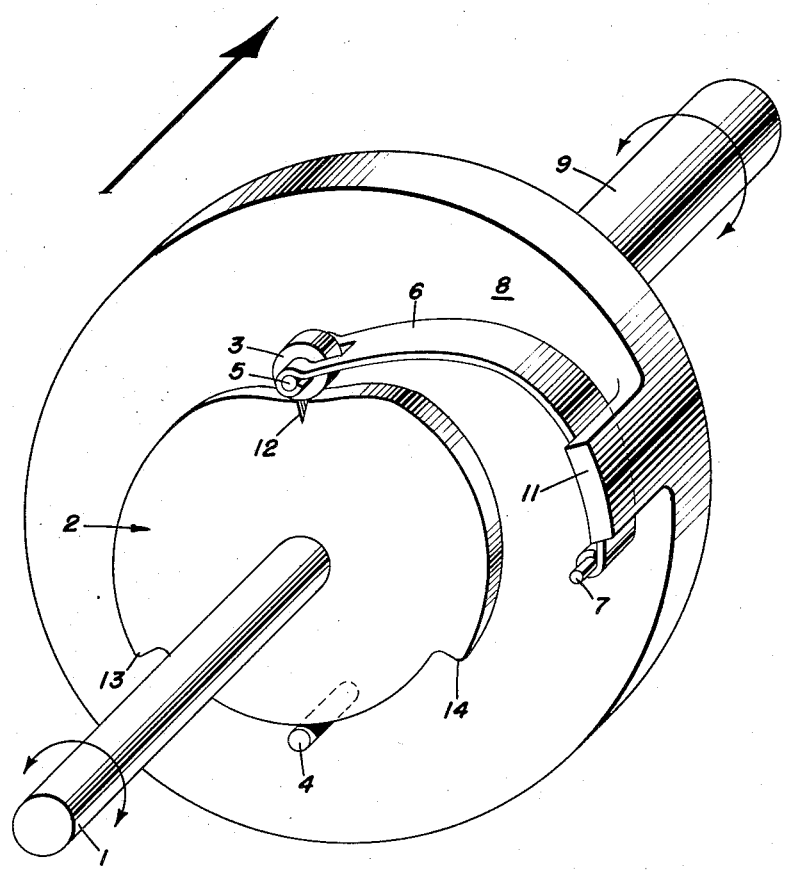
INVENTORS
OTIS L. STEVENS
EDWARD J. MILLARD, Sr.
BY
ATTORNEYS

United States Patent Office 2,837,902
Patented June 10, 1958

2,837,902

MECHANICAL TORSIONAL VIBRATION DAMPER

Otis L. Stevens, Bladensburg, Md., and
Edward J. Millard, Sr., Hatboro, Pa.

Application July 12, 1956, Serial No. 597,554

4 Claims. (Cl. 64—29)

The present invention relates to a mechanical torsional vibration damper which will filter undesirable quantities of motion and transmit an accurate rotational quantity.

Torque transmitting devices with smoothing features mainly are directed to absorbing shock and usually fail to maintain alignment between the driven and the driving member. Soft centers in wheels and plates as well as resilient torsional members have been used in the past to transmit rotary motion of desired quantities and to dampen undesirable perturbations of motion. The known devices of this type, however, do not maintain alignment of transmission and are damaged if forced beyond their intended load limit.

An object of this invention is to obviate the transmission of undesired disquieting motions in rotary transmitting apparatus.

Another object is to provide a torque transmitting device capable of changing an undesirable phase relationship between a driving and a driven member.

A further object of the invention is the provision of a mechanical torsional vibration damper which will enable rotary transmission of desired quantities, both steady and oscillatory, with a high degree of accuracy while suppressing undesirable quantities of motion either sustained or periodic.

Still another object is to provide a device which will transmit torque in both clockwise and counterclockwise direction while maintaining desired rotations and oscillations undiminished in amplitude.

Still another object is the provision of a device for shifting the input to output phase relationship of mechanical oscillations or vibrations to suppress the amplitudes of undesired mechanical oscillations or vibrations.

Other objects and many of the attendant advantages of this invention will be readily appreciated as the same becomes better understood by reference to the following detailed description when considered in connection with the accompanying drawing wherein the figure represents a perspective side elevational view of the preferred embodiment of the present invention.

The input shaft 1 is attached to the partially heart-shaped cam 2, and these components are free to rotate independent of the rest of the system, except as determined by the cam follower 3 or the limit stop pin 4. The cam follower 3 is held by the shaft 5 which in turn is positioned within the bifurcated end of a leaf spring 6. The leaf spring 6 is mounted on the pin 7 which projects laterally from the flywheel 8 and output shaft 9 is engaged to the flywheel 8 for simultaneous rotation therewith. The flywheel contains the limit stop pin 4 which extends substantially normal to the surface of the flywheel. To prevent the spring 6 from rotating about the pin 7 a projection 11 is provided on flywheel 8. The respective center lines of input shaft 1 and output shaft 9 are longitudinally aligned such that an alignment of transmission is made possible.

The partially heart-shaped cam 2 is designed to provide a detent position 12 on the null point of the cam to maintain a high accuracy of alignment between the input shaft 1 and the output shaft 9. The cam is also notched, as defined by shoulders 13 and 14, diametrically opposite the null point 12 of the cam so as to provide a limit of rotation between the input shaft 1 and the output shaft 9 as governed by the extent of the notch and the limit stop pin 4. No bearing supports for or method of applying or transmitting torque to and from the present mechanism has been shown on the figure in order to present a clear picture of the actual parts involved.

In operation torque applied to shaft 1 is normally transmitted to the shaft 9 through the cam 2, cam follower 3, spring 6, and flywheel 8 without any displacement of the cam follower 3 from its detent position on the cam 2. Excessive acceleration of motion will cause the input shaft 1 to rotate in respect to output shaft 9 up to the limit established by the stop pin 4 and the limit sop notch cut in cam 2. This rotation will ensue only during such time as acceleration is maintained. When constant velocity occurs once more, the spring 6 acts to return the cam follower 3 into the detent position on the cam 2. Perturbations of motion or vibrations which may be imposed on a fundamental signal of a mechanical nature tend to impose acceleration forces in excess of the constant of inertia and spring tension incorporated in the system to the extent that the inertia of the system is unable to follow such signals until spring tension forces are created by offset of the cam follower 3 from the detent position on the cam 2. The spring tension forces created increase to the balance necessary to maintain equilibrium of the forces created by the components involved. Such components may be varied to suit individual requirements for a particular application.

The present invention has been successfully used to cure regenerative oscillation occurring in the director-gun-ship structure loop of a gunfire control system. The device is found useful where it is desired to dampen out undesirable quantities of motion and transmit an accurate rotational quantity or to change an undesirable phase relationship existing between a driving and a driven member. It can be readily appreciated that the primary advantage of the present invention is the capability of the device to transmit accurately a desired rotation while reducing or blocking the undesired effect of both random and sustained perturbations. An additional desirable feature of the present mechanism is the small size, simplicity, ruggedness, flexibility, and economical construction.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention as set forth in the appended claims. For example, the cam 2 could be mounted on the flywheel 8 and the spring 6, shaft 5, cam follower 3, and stop pin 4 could be mounted on the input shaft 1. Also the spring 6 could be a coil type rather than a leaf type. The design of the component parts of the mechanism will depend to a large extent upon the particular application involved. Another example of a modification of the present device which has been considered and tried is of a design having coil springs acting directly on a radial plunger carrying the cam follower. Also coil springs may be employed to restrain a pivoted lever carrying the cam follower. Various means of arranging bearings to permit relative rotation of input and output shafts have also been considered to achieve the function made possible by the design of the present mechanical torsional vibration damper.

Obviously many modifications and variations of the present invention are possible in the light of the above teachings. It is therefore to be understood that within the scope of the appended claims the invention may be practiced otherwise than as specifically described.

What is claimed is:

1. A mechanical torsional vibration damper comprising an input shaft and an output shaft, a modified heart-shaped cam fixedly engaged to the input shaft for simultaneous rotation therewith, the lobes of the heart-shaped cam being formed such that a detent is provided in the upper center portion of said cam member and the lower portion of the cam member diametrically opposite to the detent having a notch provided therein, a flywheel fixedly engaged to the output shaft for rotation therewith, said flywheel being concentrically positioned in relation thereto and having a laterally extending protuberance formed adjacent the periphery of the flywheel, a leaf spring attached to said flywheel and extending beneath said protuberance of the flywheel such that the spring is downwardly biased, said spring being bifurcated at one end, a cam follower connected to the bifurcated end of the said leaf spring and positioned within the detent of the cam and adapted for movement on the lobes of said heart-shaped cam, and a limit stop pin laterally extending from said flywheel and within the notched portion of said cam to limit the rotation thereof when excessive acceleration of motion causes the input shaft to rotate in respect to the output shaft.

2. In a device for transmitting torque, a driving member, a driven member in direct alignment with the driving member, a cam engaged to the driving member for rotation therewith, said cam being formed with lobes forming a depression therebetween to serve as a detent, limit stop means interlocking said cam with said driven member to permit limited rotation of the driven member relative to the driving member, resilient means attached at one end to said driven member and in driven engagement at the other end thereof with said detent for transmitting torque thereto from said driving member, and a cam follower adapted to move along the surface of said cam and attached to the driven member by said resilient means whereby at constant velocity of the driving member torque is transmitted through the cam follower resting in said detent and through the resilient means to the driven member without movement of the cam follower on the cam surface, whereas acceleration forces of the driven member causes the driving member to rotate a liquid amount with respect to the driven member and the cam follower to move about the cam surface to alter the tension of the resilient means until equilibrium of forces between the driving and driven members is reached.

3. A mechanical torsional vibration damper comprising an input shaft and an output shaft, cam means fixedly engaged to said input shaft for simultaneous rotation therewith, said cam means being formed with lobes such that a detent is provided in the upper center portion of said cam means, plate means fixedly engaged to said output shaft for rotation therewith and concentrically positioned in relation thereto, said plate means being disposed in close spaced adjacency relative to said cam means, resilient means attached at one end to said plate means in a manner such that said resilient means is downwardly biased, a cam follower mounted on the other end of said resilient means adapted to rest within said detent and to move along the lobes of said cam means, and limit stop means interlocking said plate means with said cam means to limit relative rotation therebetween.

4. A mechanical torsional vibration damper comprising a driving member and a driven member, cam means fixedly engaged to said driving member for simultaneous rotation therewith, resilient means attached at one end thereof to said driven member for transmitting torque thereto from said driving member, and a cam follower mounted on the other end of said resilient means adapted to move along the surface of said cam means whereby disquieting rotary motions will be damped within said resilient means, preventing transmission thereof to said driven member.

References Cited in the file of this patent

UNITED STATES PATENTS

| | | |
|---|---|---|
| 1,441,491 | Duncan et al. | Jan. 9, 1923 |
| 1,865,559 | Montgrand | July 5, 1932 |
| 1,953,430 | Parre | Apr. 3, 1934 |
| 2,637,987 | Hill et al. | May 12, 1953 |
| 2,688,857 | Jones | Sept. 14, 1954 |

UNITED STATES PATENT OFFICE
CERTIFICATE OF CORRECTION

Patent No. 2,837,902                                         June 10, 1958

Otis L. Stevens et al.

It is hereby certified that error appears in the printed specification of the above numbered patent requiring correction and that the said Letters Patent should read as corrected below.

Column 4, line 5, for "liquid" read -- limited --.

Signed and sealed this 26th day of August 1958.

(SEAL)
Attest:

KARL H. AXLINE
Attesting Officer

ROBERT C. WATSON
Commissioner of Patents